United States Patent [19]

Hunger et al.

[11] 4,082,741
[45] Apr. 4, 1978

[54] DISAZO PIGMENTS DERIVED FROM 3,8-DIAMINO-PHENANTHRIDONE-(10)

[75] Inventors: Klaus Hunger; Dieter Weber, both of Kelkheim, Taunus, Germany

[73] Assignee: Hoechst Aktiengesellschaft, Frankfurt am Main, Germany

[21] Appl. No.: 751,072

[22] Filed: Dec. 16, 1976

[30] Foreign Application Priority Data

Dec. 20, 1975    Germany .............................. 2557555

[51] Int. Cl.$^2$ ...................... C09B 33/12; C09B 33/14; D06P 1/44; D06P 1/52
[52] U.S. Cl. ..................................... 260/154; 106/23; 106/288 Q; 260/155; 260/288 CF
[58] Field of Search ................................ 260/154, 155

[56]  References Cited

U.S. PATENT DOCUMENTS

| 1,820,039 | 8/1931 | Zitscher et al. ...................... 260/155 |
| 2,102,593 | 12/1937 | Helberger et al. .................. 260/155 |
| 2,136,300 | 11/1938 | Helberger et al. .................. 260/155 |
| 2,856,396 | 10/1958 | Durig ............................... 260/146 R |

Primary Examiner—Floyd D. Higel
Attorney, Agent, or Firm—Curtis, Morris & Safford

[57]   ABSTRACT

The compounds obtained by bis-diazotizing 3,8-diamino-phenanthridone-(10) and coupling it onto one or a mixture of enolizable ketomethylene coupling components having no solubilizing groups are pigments of high tinctorial strength and fastness to migration, heat, light and chemicals.

10 Claims, No Drawings

DISAZO PIGMENTS DERIVED FROM 3,8-DIAMINO-PHENANTHRIDONE-(10)

The present invention relates to novel valuable disazo compounds of the general formula I

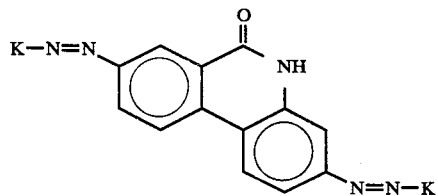

wherein K represents radicals of identical or different coupling components which contain no solubilizing groups.

K is particularly the radical of an enolizable ketomethylene compound, as for example aryl acylacetamides or N-heterocyclics.

Preferred radicals K of this type correspond to the formulae (II) to (IV):

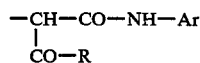

R being methyl or phenyl and Ar a radical of the formula

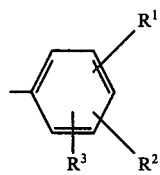

wherein $R_1$, $R_2$ and $R_3$ which may be identical or different represent hydrogen, chlorine, bromine, lower alkyl, lower alkoxy, lower alkanoylamino, benzoylamino, nitro, trifluoromethyl or cyano, or Ar is a radical of the formulae

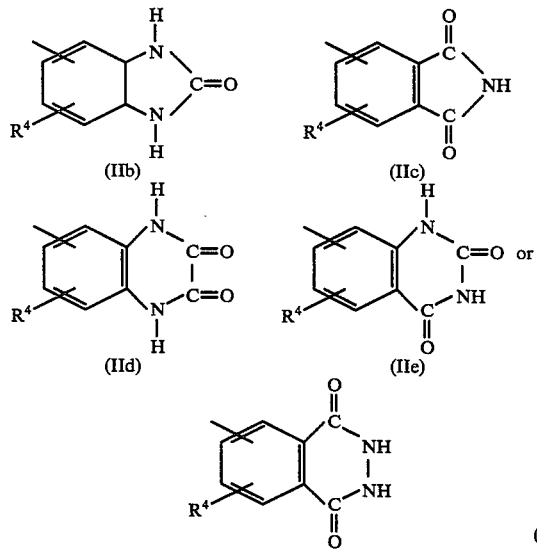

wherein $R^4$ represents hydrogen, chlorine, bromine, lower alkyl, lower alkoxy, lower carboalkoxy or nitro;

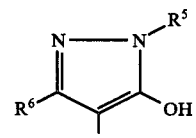

wherein $R^5$ represents phenyl, tolyl or chlorophenyl and $R^6$ is methyl, lower carboalkoxy or lower alkanoylamino;

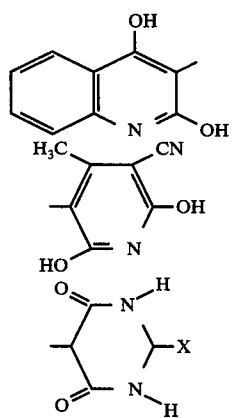

wherein X is oxygen, sulfur or =NH.

Here and in the following the term "lower" in alkyl and alkoxy represents radicals having 1 to 4 carbon atoms, in alkanoyl the term means radicals having (in the whole) 2 to 5 carbon atoms and in carboalkoxy alcohol radicals having 1 to 4 carbon atoms.

As radicals Ar of the general formula (IIa) there are considered for example:

phenyl; o-, m-, p-tolyl; o-, m-, p-methoxyphenyl; o-, m-, p-ethoxyphenyl; o-, m-, p-chlorophenyl; o-, m-, p-bromophenyl; o-, m-, p-nitrophenyl; 2,4-dimethylphenyl, 2,5-dimethoxyphenyl, 2,3-dichlorophenyl, 2,4-dichlorophenyl, 2,5-dichlorophenyl, 2,4,5-trichlorophenyl, 2-chloro-3-methylphenyl, 2-chloro-4-methylphenyl, 2-chloro-5-methylphenyl, 3-chloro-2-methylphenyl, 4-chloro-2-methylphenyl, 2-methoxy-5-chlorophenyl, 2,5-dimethoxy-4-chlorophenyl, 2,4-dimethoxy-5-chlorophenyl, 2-methoxy-4-chloro-5-methylphenyl, 4-acetylaminophenyl or 4-benzoylaminophenyl.

As radicals Ar of the formula (IIb) there are especially considered benzimidazol-2-on-5-yl, 7-chloro-benzimidazol-2-on-5-yl and 7-methyl-benzimidazol-2-on-5-yl.

As pyrazolone radicals of the formula (III) there are considered for example the radicals of 1-phenyl-3-methylpyrazolone-(5), 1-tolyl-3-methyl-pyrazolone-(5), 1-phenyl-3-carbomethoxypyrazolone-(5), 1-p-tolyl-3-carboethoxypyrazolone-(5) or 1-phenyl-3-acetylaminopyrazolone-(5).

The invention further relates to a process for the preparation of the disazo compounds of the general formula I, wherein the diazo component of the formula (III)

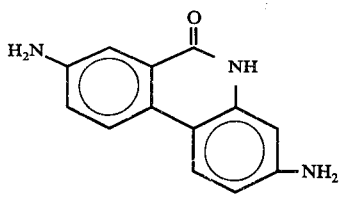 (III)

is bis-diazotized according to known processes and the bisdiazonium compound thus obtained is combined in usual manner with 2 equivalents of the coupling components K — H, for example in an aqueous medium. A single coupling component or a mixture of several coupling components may be used.

The diazo component of the formula (III) and its use for the preparation of substantive disazo dyestuffs is known from Ukrain.Khim.Zhur. 21 (1955) 614 – 618, C.A. 50 (1956) 9021 d. It may be obtained for example by reaction of 2,7-dinitrofluorenone-oxime with mineral acids in the heat or by reaction of 2,7-dinitro-fluorenone with aqueous sodium azide and concentrated sulfuric acid and subsequent reduction of the dinitro-phenanthridone thus obtained, for example with hydrogen in the presence of catalysts.

The bisdiazotation of the diamine of the formula (III) may be effected for example with akali metal nitrites or nitrous acid lower alkyl esters and a mineral acid, but also with nitrosyl sulfuric acid at temperatures of from about −10° to +50° C, preferably 0° – 30° C. It may be advantageous, as well as during the subsequent coupling, to add surfactants, for example nonionic, anionic or cationic dispersing agents. Coupling is effected at temperatures of from about 0° to 80° C, preferably 0° to 50° C, especially 10° to 30° C.

Diazotation and coupling may also be effected in the presence of suitable organic solvents, as for example glacial acetic acid, lower alkanols, dioxane, formamide, dimethyl-formamide, dimethylsulfoxide, pyridine or N-methylpyrrolidone. To obtain the full tinctorial strength and a particularly favorable crystal structure it is often advantageous to heat the coupling mixture for some time, for example to the boil, or to maintain the mixture under pressure at temperatures above 100° C to preferably 200° C, if desired in the presence of organic solvents such as ethanol, o-dichlorobenzene, dimethylformamide or in the presence of resin soap. Especially pure and color intense pigments are obtained with the products of the invention when, after coupling, the moist press-cakes or the dried powders are subjected to a thermal after-treatment with organic solvents, such as alcohols, especially lower alkanols, pyridine, glacial acetic acid, dimethylformamide, N-methylpyrrolidone, dimethylsulfoxide, dichlorobenzene or nitrobenzene or when the pigments are ground with addition of grinding auxiliaries.

The pigments may also be prepared in the presence of a carrier material, for example barium sulfate.

The novel pigments are waterinsoluble and insoluble in the usual organic solvents and are suitable for the preparation of printing inks, color lacquers and dispersion paints, for dyeing rubber, plastic materials and natural or synthetic resins. They are furthermore suitable for pigment printing on substrates, especially textile fibre materials or other flat articles, as for example paper, sheet material or films.

The pigments may also be used for other purposes, for example in finely divided form for dyeing spun rayon from viscose or cellulose ethers or esters, polyamides, polyurethanes, polyglycol terephthalate or polyacrylonitriles in the spinning mass or for dyeing paper.

The pigments may be processed easily due to their good dispersibility in the mentioned media. The dyeings have an excellent color intensity and fastness to migration, especially an excellent fastness to bleeding in plastics and fastness to overlacquering, as well as a good fastness to light, and they are fast to the action of heat and the influence of chemicals, especially solvents.

The following Examples illustrate the invention. Parts and percentages are by weight unless stated otherwise.

EXAMPLE 1

22.5 g of 3,8-diamino-phenanthridone are dissolved in 200 ml of water and 21 ml of 31% hydrochloric acid and precipitated with 30 ml of 31% hydrochloric acid as the hydrochloride. The suspension is cooled with ice to 0° C. 27 ml of a 40% sodium nitrite solution are rapidly added under the surface, and the mixture is stirred for 30 minutes with nitrite in excess.

In a different vessel 43 g of N-acetoacetyl-2,4-dimethylanilide are dissolved in 1200 ml of water and 20 ml of a 33% sodium hydroxide solution. The solution is clarified over a kieselguhr layer. 1 g of an emulsifier consisting of oxethylated hydrogenated tallow fatty alcohol is added, and at 15° C, 14 ml of glacial acetic acid are added at once while stirring well. The diazo solution which has been freed from the excess of nitrite with a small amount of amidosulfonic acid and then clarified, is added dropwise to the suspension thus obtained in the course of one hour at 20° – 25° C. The pH value is maintained at 5.4 – 5.6 by simultaneous addition of diluted sodium hydroxide solution. When coupling is finished the mixture is heated to 95° C. This temperature is maintained for 30 minutes. The mixture is suction-filtered at about 70° C. The pigment press cake is washed free from salt with water, dried and ground.

For the after-treatment 18 g of the pigment of the formula

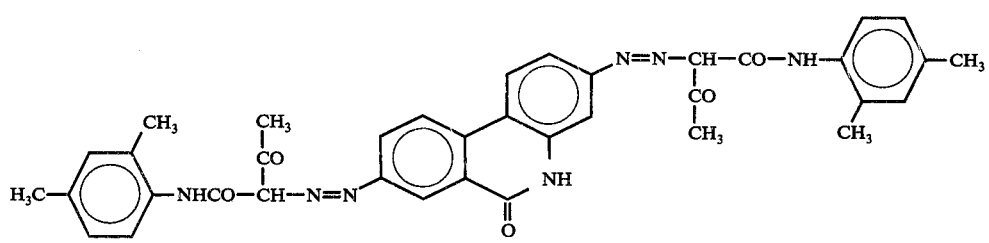

thus obtained are stirred with 260 ml of N-methyl-pyrrolidone and heated for 30 minutes to 165° – 170° C. The mixture is cooled to 70° C and suction-filtered, then the pigment is washed with ethanol, dried and ground.

A reddish yellow pigment powder is obtained which has an excellent tinctorial strength and fastness to migration as well as a good fastness to light.

EXAMPLE 2

43.5 g of N-acetoacetyl-4-methoxy-anilide are dissolved in 900 ml of water and 20 ml of a 33% sodium hydroxide solution. The solution is clarified over a layer of kieselguhr. After addition of 2 g of an emulsifier consisting of oxethylated, hydrogenated tallow fatty alcohol 20 ml of glacial acetic acid are added at once at 20° C. The diazo solution prepared according to Example 1 from 22.5 g of 3,8-diamino-phenanthridone is added dropwise in one hour while stirring, and the pH value is maintained at 4.6 – 4.8 by introducing diluted sodium hydroxide solution. Stirring is continued for 30 minutes, the mixture is heated to 95° C, and this temperature is maintained for 45 minutes. Then the mixture is cooled to about 70° C and suction-filtered. The press-cake is washed free from salt with water, dried and ground. 20 g of the pigment thus obtained of the formula

EXAMPLE 3

39.5 g of 3-methyl-1-(4'-tolyl)-pyrazolone-(5) are dissolved in 900 ml of water and 53.6 ml of a 33% sodium hydroxide solution. The solution is clarified over a layer of kieselguhr, 2 g of an emulsifier consisting of oxethylated, hydrogenated tallow fatty alcohol are added, the mixture is cooled with ice to 15° C and, while stirring well, 40 ml of glacial acetic acid are added at once. A pH value of 5.5 is obtained. The diazo solution prepared according to Example 1 from 22.5 g of 3,8-diaminophenantridone is added dropwise in one hour while stirring to the so-obtained suspension and the pH value is maintained at 5.4 – 5.6 with diluted sodium hydroxide solution. Stirring is continued for 30 minutes, then the mixture is heated to 95° C and this temperature is maintained for 30 minutes. The pigment suspension is suction-filtered at 70° C. The press-cake is washed free from salt with water, dried and ground.

For the thermal after-treatment 24 g of the dry pigment are heated for 3 hours to 150° C in 420 ml of N-methyl-pyrrolidone. Then the temperature is increased for one and a half hour to 180° C. At about 70° C the pigment is isolated by suction-filtering. It is washed with ethanol, dried and ground.

A yellowish orange pigment powder of the formula

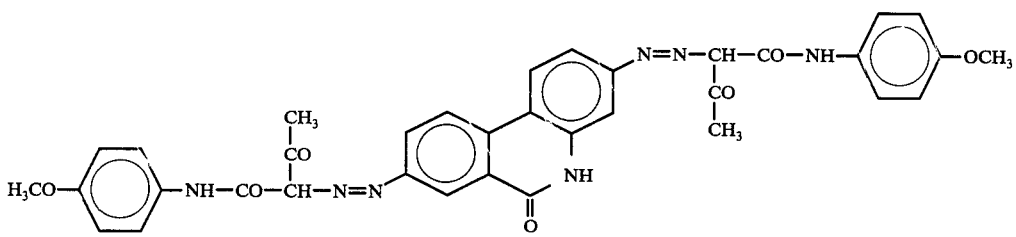

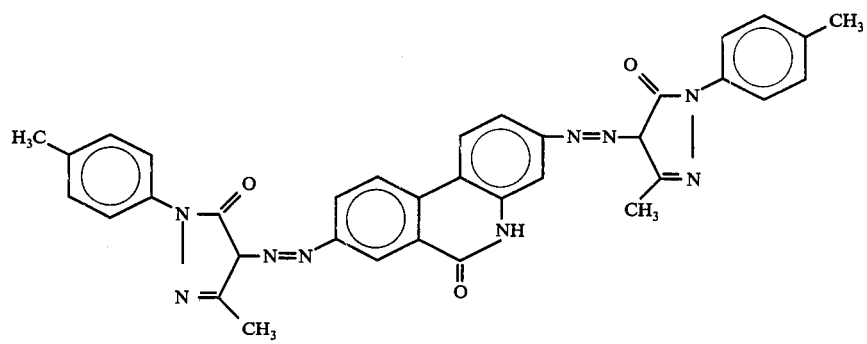

are stirred in 230 ml of dimethylformamide for 5 hours at 150° C. Then the suspension is cooled to 70° C, suction-filtered, the press-cake is washed with ethanol, dried at 60° C and ground.

A yellowish orange pigment powder is obtained which is especially characterized by its excellent tinctorial strength and fastness to migration and a very good fastness to light.

is obtained which has an excellent tinctorial strength and fastness to migration and a good fastness to light.

EXAMPLE 4

If in Example 3 instead of 39.5 g of 3-methyl-1-(4'-tolyl)pyrazolone-(5) 26.9 g of barbituric acid are used, a pigment of the formula

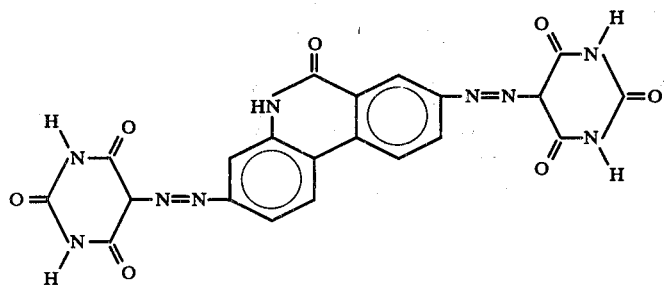

is obtained.

For the after-treatment 20 g of this dry pigment are stirred in 600 ml of dimethylsulfoxide for 2 hours at 150° C and subsequently for 1 ½ hours at 180° C. The suspension is allowed to cool to 70° C and suction-filtered. The press-cake is washed with ethanol, dried and ground.

A yellowish red pigment powder is obtained having a good fastness to light and an excellent tinctorial strength and fastness to migration.

The following Table lists further pigments which are prepared according to the process of the preceding Examples. They are characterized by the coupling component and the shade of the pigment.

| Coupling component | Shade of the pigment |
|---|---|
| N-acetoacetyl-anilide | reddish yellow |
| N-acetoacetyl-2-methyl-anilide | reddish yellow |
| N-acetoacetyl-2-methoxy-anilide | reddish yellow |
| N-acetoacetyl-2-ethoxy-anilide | reddish yellow |
| N-acetoacetyl-4-ethoxy-anilide | reddish yellow |
| N-acetoacetyl-2-chloro-anilide | yellowish orange |
| N-acetoacetyl-4-chloro-anilide | yellowish orange |
| N-acetoacetyl-2,5-dichloro-anilide | yellowish orange |
| N-acetoacetyl-4-chloro-2-methyl-anilide | yellowish orange |
| N-acetoacetyl-5-chloro-2-methoxy-anilide | yellowish orange |
| N-acetoacetyl-4-chloro-2,5-dimethoxy-anilide | reddish yellow |
| 5-acetoacetylamino-benzimidazolone | reddish yellow |
| 3-methyl-1-phenyl-pyrazolone-(5) | orange |
| 3-cyano-6-hydroxy-4-methyl-pyridone-(2) | bordo |
| N-acetoacetyl-4-methyl-anilide | reddish yellow |

We claim:

1. A compound of the formula

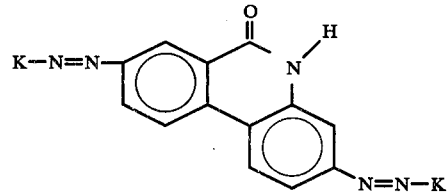

wherein K stands for the same or different groups of the formula

-CH-CO-NH-Ar
 |
 CO-R in which R is methyl or phenyl and Ar is a group of the formula

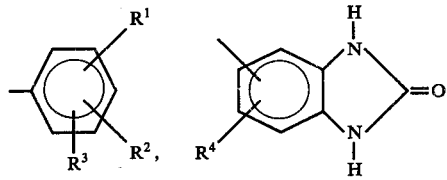

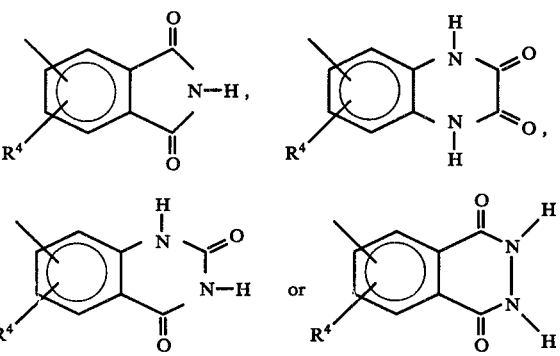

wherein $R^1$, $R^2$ and $R^3$, which are the same or different, are hydrogen, chlorine, bromine, lower alkyl, lower alkoxy, lower alkanoylamino, benzoylamino, nitro, trifluoromethyl or cyano; $R^4$ is hydrogen, chlorine, bromine, lower alkyl, lower alkoxy, lower carboalkoxy or nitro, or K is a group of the formula

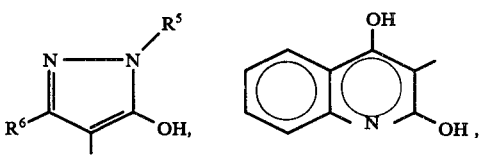

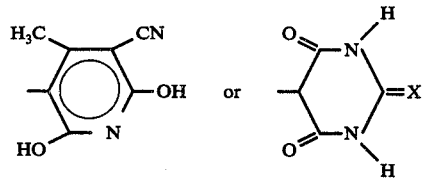

wherein $R^5$ is phenyl, tolyl or chlorophenyl; $R^6$ is methyl, lower carboalkoxy or lower alkanoylamino and X is oxygen, sulfur or =NH.

2. A compound as claimed in claim 1, wherein K is

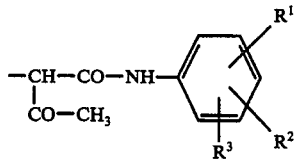

in which $R^1$, $R^2$ and $R^3$ are defined as in claim 1.

3. A compound as claimed in claim 2, wherein $R^1$, $R^2$ and $R^3$, which are the same or different, are hydrogen, chlorine, methyl or methoxy.

4. A compound as claimed in claim 1, wherein K is

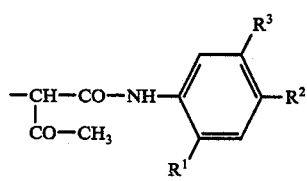

wherein $R^1$, $R^2$ and $R^3$, which are the same or different, are hydrogen, chlorine, methyl or methoxy.

5. The compound as defined in claim 4, wherein $R^1$ and $R^2$ are methyl and $R^3$ is hydrogen.

6. The compound as defined in claim 4, wherein $R^1$ and $R^3$ are hydrogen and $R^2$ is methoxy.

7. The compound as defined in claim 4, wherein $R^1$ is methoxy and $R^2$ and $R^3$ are hydrogen.

8. The compound as defined in claim 4, wherein $R^1$ and $R^3$ are methoxy and $R^2$ is chlorine.

9. A compound as claimed in claim 1, wherein K is a group of the formula

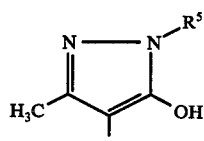

in which $R^5$ is phenyl or tolyl.

10. The compound as defined in claim 9, wherein $R^5$ is p-tolyl.

* * * * *